United States Patent
Rao

[11] Patent Number: 6,111,890
[45] Date of Patent: Aug. 29, 2000

[54] GIGABUFFER LITE REPEATER SCHEME

[75] Inventor: Sailesh Krishna Rao, Colts Neck, N.J.

[73] Assignee: Level One Communications, Inc., Sacramento, Calif.

[21] Appl. No.: 08/902,698

[22] Filed: Jul. 30, 1997

Related U.S. Application Data

[60] Provisional application No. 60/042,066, Mar. 25, 1997.

[51] Int. Cl.$^7$ .................................................... H04J 3/02
[52] U.S. Cl. ............................................................. 370/462
[58] Field of Search .................................... 370/445–447, 370/274, 285, 419, 420, 461, 462, 463, 492, 501, 502, 319, 329, 344, 347, 522, 425; 340/825.5, 825.01–825.03; 359/136

[56] References Cited

U.S. PATENT DOCUMENTS

| | | | |
|---|---|---|---|
| 4,409,592 | 10/1983 | Hunt | 370/447 |
| 4,661,902 | 4/1987 | Hochsprung et al. | 340/825.5 |
| 4,689,786 | 8/1987 | Sidhu et al. | 370/255 |
| 4,707,829 | 11/1987 | Pendse | 370/445 |
| 4,884,266 | 11/1989 | Pflaumer | 370/545 |
| 5,103,446 | 4/1992 | Fischer | 370/236 |
| 5,305,320 | 4/1994 | Andrews et al. | 370/229 |
| 5,351,241 | 9/1994 | Yehonatan | 370/446 |
| 5,357,542 | 10/1994 | Suzuki et al. | 370/522 |
| 5,359,320 | 10/1994 | Jaffe et al. | 370/448 |
| 5,422,885 | 6/1995 | Nadkarni | 370/451 |
| 5,430,843 | 7/1995 | Sato et al. | 395/200 |
| 5,577,172 | 11/1996 | Vatland et al. | 395/114 |
| 5,623,606 | 4/1997 | Yokoyama et al. | 395/200.62 |
| 5,729,701 | 3/1998 | Eriksson | 395/290 |

OTHER PUBLICATIONS

Tranzillo Kevin, "Gigaprimer", Communications News, vol. 33, P23., Dec. 1996.
Grow Kristine, "A closer look at gigabit Ethernet", vol. 8, P25, 4P, Mar. 1997.

*Primary Examiner*—Seema S. Rao
*Attorney, Agent, or Firm*—Merchant & Gould P.C.

[57] ABSTRACT

A gigabuffer repeater transmission protocol minimizes the amount of buffering necessary at the repeater. Minimum buffer memory requirements are accomplished by using the initial portion of the data packet as the "Request to Send" message and waits, if necessary, until it receives a "Clear to Send" signal from the repeater. Thus, the repeater retains the majority of the buffering at the source of the data, where it is typically cheapest. Further, the repeater transmission scheme can be applied to centrally arbitrated repeaters.

21 Claims, 4 Drawing Sheets

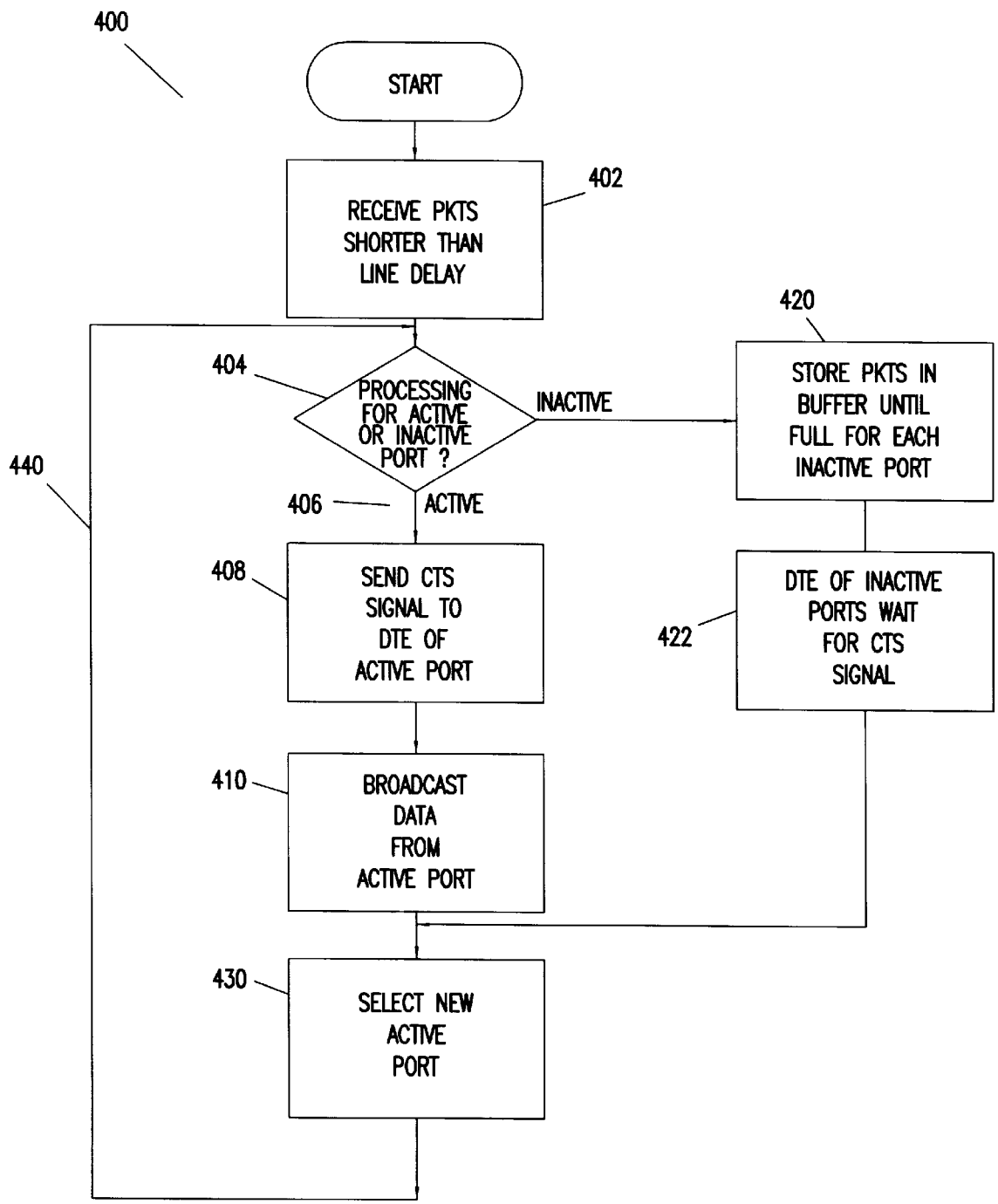

GIGABUFFER LITE REPEATER SCHEME

This application claims the benefit of U.S. Provisional No. 60/042,066 filed Mar. 25, 1997.

BACKGROUND OF THE INVENTION

1. Field of the Invention

This invention relates in general to a repeater transmission protocol and data buffering scheme, and more particularly to a centrally arbitrated repeater device for Local Area Networks (LANs) having increase bandwidth utilization and minimum buffer memory requirements.

2. Description of Related Art

A local area network (LAN) is a communication system that provides interconnection among a number of independent computing stations within a small area. Data is usually transmitted using a tree or bus typology. Data is transmitted in a network and units are usually referred to as "frames" or "packets". Each packet includes control information such as the address of the packet source (transmit station) and the address of the packet destination (receive station). These concepts have been expanded for metropolitan area networks (MANs) and Wide Area Networks (WANs).

Because a wide variety of physical, electrical and procedural characteristics available to designers of equipment for local area network, it has become widely acknowledged that certain standards must be observed. For example, the International Organization For Standardization (ISO) has developed a voluntary Open Systems Interconnection (OSI) model which defines a general computer system architecture. An "open" system may be implemented in any way provided that it confirms to a minimal set of OSI standards that allows it to communicate with other "open" systems. A number of local area network protocol standards have been developed by the institute of electrical and electronics engineers (IEEE) 802 committee. One of these standards, the IEEE 802.3 standard, defines a protocol for a bus/tree local area network. As discussed below, the IEEE 802.3 standard defines a bus/tree protocol that implements the carrier sense multiple access with a collision detection (CSMA/CD). The standard also defines a media access control (MAC) function for transmitting packets to and receiving packets from the transmission media as well as packet structure and the interaction that takes place between MAC entities in the network.

The length of a bus/tree network can be extended by connecting together a number of medium "segments" using "repeaters". A repeater comprises two or more MAUs and associated logic joined together and connected to two or more different segments of the network medium by corresponding AUIs. The repeater passes retimed digital signals in both directions between the two segments, amplifying and regenerating the signals as they pass through.

Repeaters in Local Area Networks (LANs) are simple devices for broadcasting data packets originating at one port of the repeater to all other ports. Multiple end stations, i.e., Data Terminal Equipment (DTEs), connect to repeaters via coaxial cables, or twisted-pair wiring, or optical fiber in the LAN.

The main task of a repeater is to handle "collisions." Collisions happen when multiple ports attempt to transmit data at roughly the same time, such that there is a conflict in the network as to which port "wins."

Because all stations in a network share a common transmission medium, only one station may transmit at a time. A transmitted packet propagates through the medium, is received by all stations on the network and is copied by the destination station to which it is addressed.

Current design of repeaters are based on either IEEE 802.3 Carrier Sense Multiple Access with Collision Detection (CSMA/CD) standard for Local Area Networks, IEEE 802.12 Demand Priority Access Method (DPAM) standard for Local Area Networks, or RTS/CTS scheme used in RS-232.

According to the CSMA/CD technique, if a repeater wishing to transmit senses that the medium is idle, then it transmits. If the repeater senses that the medium is busy, it continues to listen to the medium until it senses that the medium is idle and then immediately transmits.

Carrier Sensing Multiple Access with Collision Detection (CSMA/CD) repeaters replace all colliding data packets with a "JAM" signal such that every port detects the collision. Then each port "backs off" for a random amount of time and tries to resend the data packet.

In the Demand Priority Access Method (DPAM), the repeater acts as a central arbitrator. It "grants" access to the LAN to each port and if the DTE at the port has any data to send, it "captures" the LAN.

In the Request-to-Send (RTS), Clear-to-Send (CTS) scheme, such as that used in RS-232, every DTE that has data to send, first issues an RTS to the repeater. The repeater then handles all RTSs on a first-come-first-served basis and issues a CTS at the selected port. The selected DTE then transmits the data.

The difficulty with all of the above schemes is that the bandwidth utilization of the LAN declines drastically as LAN speeds increase. This is because of the round trip delay associated with the wiring that connects the DTE to the repeater. For instance, at LAN speeds of 1 Gb/s, the 1.2 microsecond round-trip delay of 100 m twisted-pair cooper wiring (which is ubiquitous in current installations) translates to an equivalent of 1.2 Kbits of data. If we were to use an RTS/CTS scheme, the minimum packet size were 512 bits, and all ports are sending minimum size packets, the bandwidth utilization of the repeater is less than 30%. This is because for more than two-thirds of the time, the repeater is sending CTS signals and waiting for a response instead of doing data transmission.

It can be seen that there is a need for a repeater scheme that minimizes the amount of buffering necessary at the repeater.

It can also be seen that there is a need for increase bandwidth utilization.

SUMMARY OF THE INVENTION

To overcome the limitations in the prior art described above, and to overcome other limitations that will become apparent upon reading and understanding the present specification, the present invention discloses a gigabuffer repeater transmission protocol that minimizes the amount of buffering necessary at the repeater and increases bandwidth utilization.

The present invention solves the above-described problems by using the initial portion of the data packet as the "Request to Send" message and waits, if necessary, until it receives a "Clear to Send" signal from the repeater. Thus, the repeater retains the majority of the buffering at the source of the data, where it is typically cheapest.

A system in accordance with the principles of the present invention determines a first active port on a repeater, receives a first data packet on the first active port, the first data packet being shorter than a link delay associated the first active port, sends a Continue-To-Send (CTS) signal to a first DTE coupled to the active port after receipt of the first packet, the CTS signal indicating to the first DTE permission to complete transmission of the data, and broadcasts data packets received on the active port.

Other embodiments of a system in accordance with the principles of the invention may include alternative or optional additional aspects. One such aspect of the present invention is that data packets from inactive ports are stored in a buffer for each of the inactive ports, one of the inactive ports is selected as a new active port once transmission on the first active port is completed, the buffer of the new active port is emptied by broadcasting the buffered packets and a CTS signal is sent to the a DTE coupled to the new active port for indicating permission for the new DTE to continue data transmission.

Another aspect of the present invention is that a DTE of an inactive port waits until a CTS signal is received before sending data packets once the buffer associated with the inactive port is filled.

Another aspect of the present invention is that an active port is determined by identifying that only one port is transmitting data and selecting that port as the active port.

Yet another aspect of the present invention is that an active port is determined by selecting at random one of a plurality of ports transmitting data to be the active port.

Another aspect of the present invention is that an active port is determined by selecting one of a plurality of ports transmitting data to be the active port using a round robin method.

Another aspect of the present invention is that the repeater comprises a gigabit per second repeater.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates a flow chart of the repeater scheme according to the invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a gigabuffer repeater transmission protocol that minimizes the amount of buffering necessary at the repeater.

Figure 1:
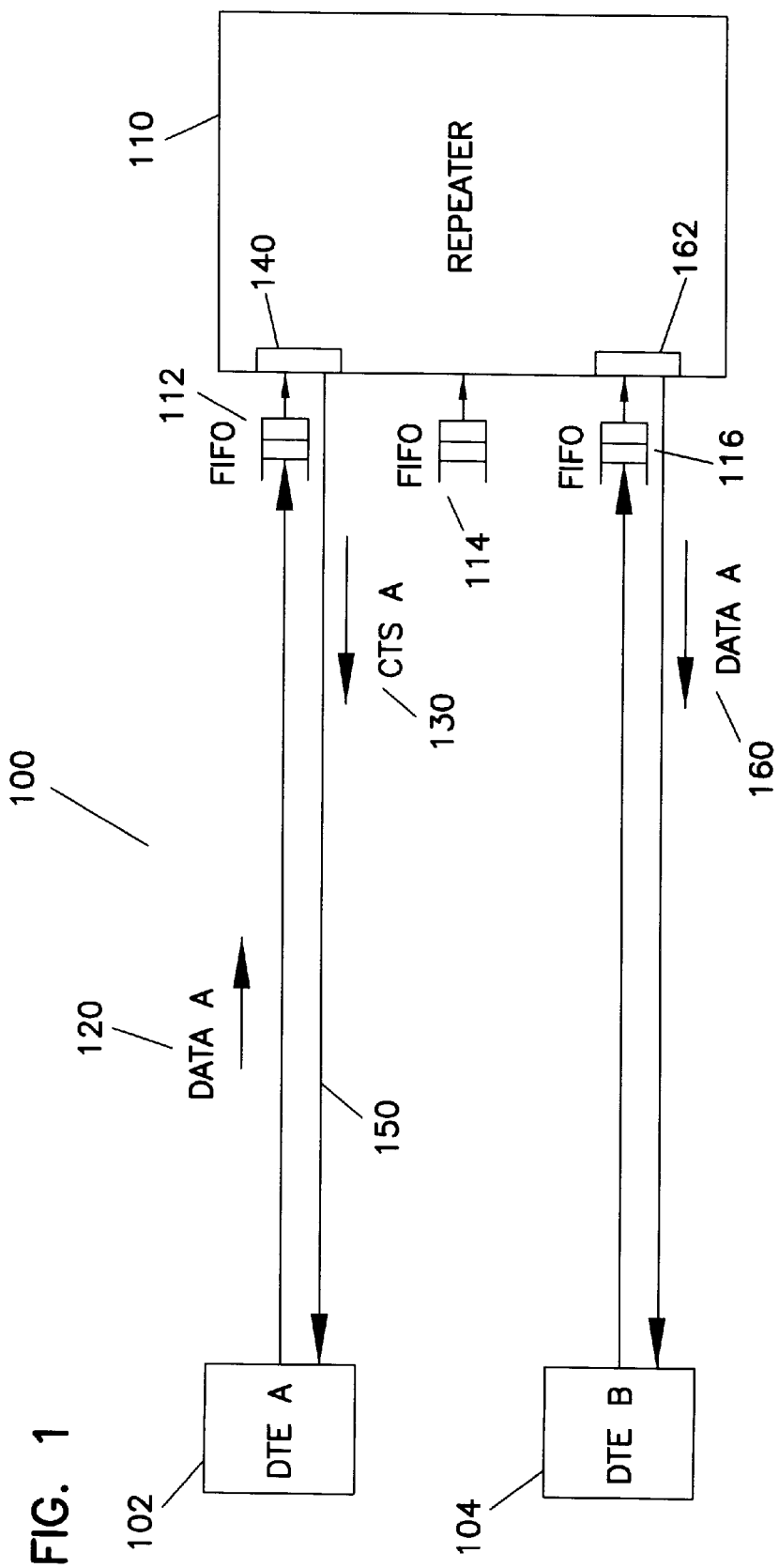
FIG. 1 illustrates the operation of a gigabuffer repeater transmission protocol according to the present invention.

FIG. 1 illustrates a gigabuffer repeater transmission protocol 100 according to the present invention. In FIG. 1, two Data Terminal Equipment devices (DTEs) 102, 104 are shown connected to a repeater 110. The repeater 110 includes a buffer 112, 114, 116 for each port wherein data is first received.

The transmission protocol for the repeater 110 according to the present invention functions similarly to the RTS/CTS scheme. However, instead of sending an RTS signal, a DTE 102 first sends an initial portion of a data packet 120. If the data packet 120 is shorter than the round trip delay of the link, the DTE 102 has completed the data transmission and their current task is finished. In the short packet case, a DTE 102 will not send another data packet on the wire until a CTS signal 130 is received from the repeater 110. If the data packet 120 is longer than the round trip delay of the link, the DTE 102 will stop transmission at this limit, unless or until the DTE 102 receives a CTS signal 130 from the repeater 110.

For example, in a situation where only one port 140 is active and wishes to transmit data, the path 150 is then clear for the repeater 110 to send a CTS signal 130 back to the DTE 102 and broadcast the port data 160 to all other ports 162. The DTE 102 now does not have to miss a beat in the data transmission.

Figure 2:
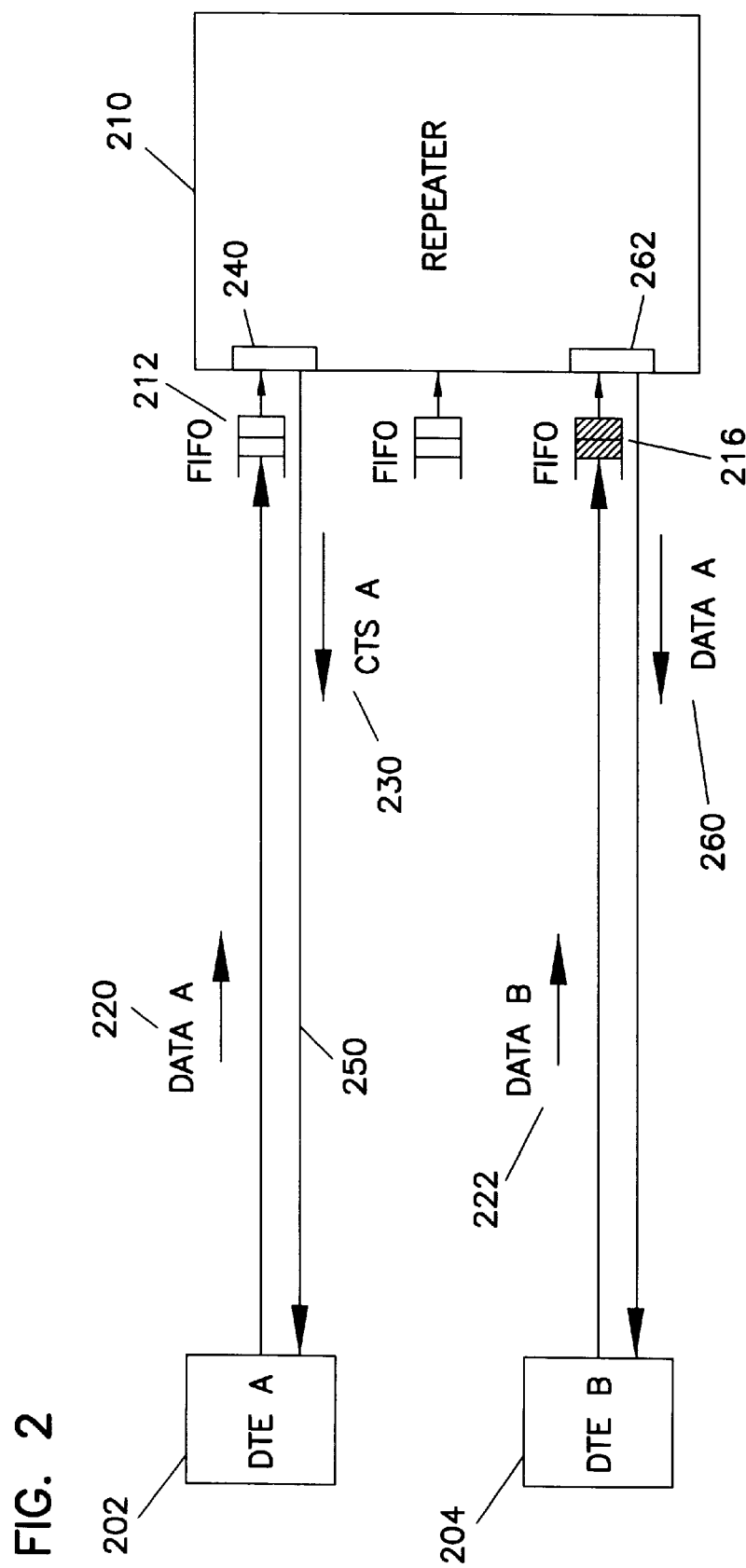
FIG. 2 illustrates the operation of a gigabuffer repeater transmission protocol wherein two ports are active simultaneously.

FIG. 2 illustrates the operation of a gigabuffer repeater transmission protocol 200 wherein two ports 240, 262 are active simultaneously. In FIG. 2, both DTE A 202 and DTE B 204 attempt to transmit data 220, 222 at the same time. The repeater 210 randomly, or in a round robin fashion, picks port A 240 or port B 262 as the winner. In FIG. 2, port A 240 is illustrated as being selected. After the data packet from DTE A 202 has been received by the repeater 210, the repeater 210 sends a CTS signal 230 back to DTE A 202. The repeater 210 also broadcasts DATA A 260 to DTE B 204. Since DTE B 204 does not receive a CTS signal, DTE B 204 begins to fill the input FIFO 216 of on port B 262 of the repeater 210. Once the FIFO 216 on port B 262 is filled, DTE B 204 must wait.

Figure 3:
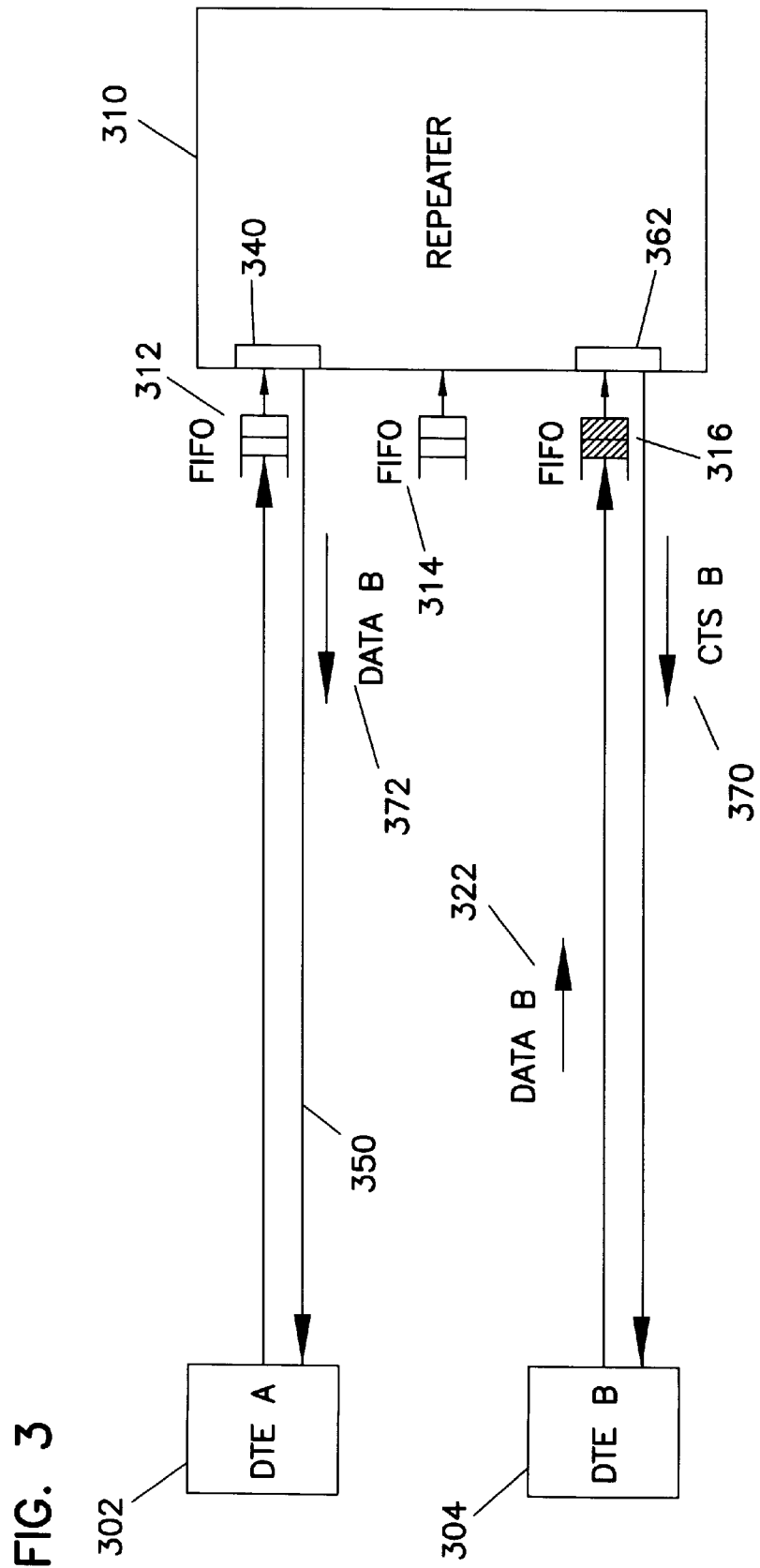
FIG. 3 illustrates the operation of the gigabuffer repeater transmission protocol wherein DTE A has completed transmission of DATA A and DTE B is signaled to continue transmitting DATA B.

FIG. 3 illustrates the operation of the gigabuffer repeater transmission protocol 300 wherein DTE A 302 has completed transmission to the repeater 310 and the repeater 310 has completed its broadcast of data from port A 340. In FIG. 3, the repeater 310 begins to empty the FIFO 316 of port B 362, broadcast DATA B 372 and send a CTS B signal 370 to DTE B 304. Once the CTS B signal 370 has been received by DTE B 304, DTE B 304 can continue to send the rest of the packet DATA B 322.

FIG. 4 illustrates a flow chart 400 of a repeater scheme according to the invention for providing increased bandwidth utilization and minimum buffer memory requirements. In FIG. 4, data packets shorter than the line delay are received by a repeater 402. The repeater determines which port is active 404. For the active port 406, the repeater sends a Continue-To-Send (CTS) signal to a DTE coupled to the active port 408. The repeater then broadcasts data packets received on the active port 410. Data packets from inactive ports are stored in a buffer for each of the inactive ports 420.

A DTE of an inactive port waits until a CTS signal is received before sending data packets once the buffer associated with the inactive port is filled 422. Once transmission on the first active port is completed, one of the inactive ports is selected as a new active port 430. The process is recycled 440 where upon the repeater sends a CTS signal to the new DTE coupled to the new active port to indicate permission for the new DTE to continue data transmission 408 and broadcasts the data 410.

In summary, the repeater scheme according to the invention minimizes the amount of buffering necessary at the repeater for high speed repeater networks. Minimum buffer memory requirements are accomplished by using the initial portion of the data packet as the "Request to Send" message and waits, if necessary, until it receives a "Clear to Send" signal from the repeater. Thus, the repeater retains the majority of the buffering at the source of the data, where it is typically cheapest. Further, the repeater transmission scheme according to the invention can be applied to centrally arbitrated repeaters.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of transmitting data packets between a repeater and a plurality of Data Terminal Equipment, comprising the steps of:

receiving on a first port of the repeater a first data packet transmitted from a first Data Terminal Equipment device, the data packet being no greater than the round trip delay of the link between the repeater and the first Data Terminal Equipment device;

storing the data packet in a buffer for the first port;

sending a CTS signal to the first Data Terminal Equipment to indicate permission for the first Data Terminal Equipment to complete the transmission of the data; and broadcasting the data packet.

2. The method of claim 1 wherein the data transmission is complete if the data packet is shorter than the round trip delay of the link.

3. The method of claim 1 wherein the first Data Terminal Equipment device waits until a CTS signal is received before sending another data packet.

4. The method of claim 1 wherein the receiving step further comprises the step of breaking a service data unit into packets, a first packet being selected to be shorter than the round trip delay of a link to the repeater, transmitting the first packet to the repeater and receiving the packet on a first port of the repeater.

5. The method of claim 1 wherein the repeater is a gigabit per second repeater.

6. A method of providing increased bandwidth utilization and minimum buffer memory requirements for a network having a repeater coupling data terminal equipment devices, comprising the steps of:

determining a first active port on a repeater;

receiving a first data packet on the first active port, the first data packet being shorter than a link delay associated the first active port, an initial portion of the data packet acting as a Request to Send (RTS) message;

storing data packets from inactive ports in a buffer for each of the inactive ports;

sending a Continue-To-Send (CTS) signal to a first DTE coupled to the first active port after receipt of the first data packet, the CTS signal indicating to the first DTE permission to complete transmission of the data; and broadcasting data packets received on the active port.

7. The method of claim 6 further comprising the steps of:

selecting one of the inactive ports as a new active port once transmission on the first active port is completed;

emptying the buffer of the new active port; and sending a CTS signal to a new DTE coupled to the new active port for indicating permission for the new DTE to continue data transmission.

8. The method of claim 7 wherein a DTE of an inactive port waits until a CTS signal is received before sending data packets once the buffer associated with the inactive port is filled.

9. The method of claim 6 wherein the step of determining an active port comprises the steps of identifying that only one port is transmitting data and selecting the port transmitting data as the active port.

10. The method of claim 6 wherein the step of determining an active port comprises the step of selecting at random one of a plurality of ports transmitting data to be the active port.

11. The method of claim 6 wherein the step of determining an active port comprises the step of selecting one of a plurality of ports transmitting data to be the active port using a round robin method.

12. The method of claim 6 wherein the repeater is a gigabit per second repeater.

13. A network system, comprising:

a plurality of data terminal equipment devices for transmitting data packets; and a repeater having a plurality of ports, each port being coupled to each of the plurality of data terminal equipment devices, the repeater determining a first active port for receiving a first data packet wherein an initial portion of the data packet acts as a Request to Send (RTS) message, storing data packets from inactive ports in a buffer for each of the inactive ports, sending a Continue-To-Send (CTS) signal to a first DTE coupled to the active port after receipt of the first data packet, and broadcasting data packets received on the first active port from the DTE.

14. The network system of claim 13 wherein the first data packet comprises a data packet shorter than a link delay associated the first active port.

15. The network system of claim 13 wherein the CTS signal indicates to the first DTE permission to complete transmission of data.

16. The network system of claim 13 wherein the repeater selects one of the inactive ports as a new active port once transmission on the first active port is completed, empties the buffer of the new active port and sends a CTS signal to a new DTE coupled to the new active port for indicating permission for the new DTE to continue data transmission.

17. The network system of claim 16 wherein a DTE of an inactive port waits until a CTS signal is received before sending data packets once the buffer associated with the inactive port is filled.

18. The network system of claim 13 wherein the repeater determines an active port by identifying that only one port is transmitting data and selecting the port transmitting data to be the active port.

19. The network system of claim 13 wherein the repeater determines an active port by selecting at random one of a plurality of ports transmitting data to be the active port.

20. The network system of claim 13 wherein the repeater determines an active port by selecting one of a plurality of ports transmitting data to be the active port using a round robin method.

21. The network system of claim 13 wherein the repeater is a gigabit per second repeater.

* * * * *